(12) United States Patent
Sasahara

(10) Patent No.: US 12,524,257 B2
(45) Date of Patent: Jan. 13, 2026

(54) INFORMATION PROCESSING SYSTEM INCLUDING MULTIPLE STORAGES, INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Naoto Sasahara, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 662 days.

(21) Appl. No.: 17/741,738

(22) Filed: May 11, 2022

(65) Prior Publication Data

US 2022/0374256 A1 Nov. 24, 2022

(30) Foreign Application Priority Data

May 20, 2021 (JP) ................................. 2021-085581

(51) Int. Cl.
*G06F 9/455* (2018.01)
(52) U.S. Cl.
CPC ............ *G06F 9/45558* (2013.01); *G06F 2009/45575* (2013.01); *G06F 2009/45595* (2013.01)
(58) Field of Classification Search
None
See application file for complete search history.

(56) References Cited

U.S. PATENT DOCUMENTS

| | | | |
|---|---|---|---|
| 10,216,457 B2 | 2/2019 | Takeshita | |
| 10,659,533 B1 * | 5/2020 | Zhao | G06F 12/0862 |
| 10,719,347 B2 | 7/2020 | Oohira et al. | |
| 10,778,446 B2 * | 9/2020 | Stopel | G06F 21/577 |
| 11,030,072 B2 * | 6/2021 | Huang | G06F 9/45508 |
| 11,163,728 B2 * | 11/2021 | Zheng | G06F 9/45558 |
| 11,210,070 B2 * | 12/2021 | Velammal | G06F 8/36 |
| 11,558,523 B2 * | 1/2023 | Sasaki | H04N 1/00689 |
| 11,625,360 B2 * | 4/2023 | De Lima, Jr. | G06F 12/0875 707/649 |

(Continued)

FOREIGN PATENT DOCUMENTS

| | | |
|---|---|---|
| JP | 6547306 B2 | 7/2019 |
| WO | 2018003020 A1 | 1/2018 |

OTHER PUBLICATIONS

Nathan et al. "CoMICon: A Co-Operative Management System for Docker Container Images", 2017 IEEE, pp. 116-126.*

(Continued)

*Primary Examiner* — Van H Nguyen
(74) *Attorney, Agent, or Firm* — ROSSI, KIMMS & McDOWELL LLP

(57) ABSTRACT

The present invention provides an information processing apparatus having a plurality of storages and method of controlling the information processing apparatus. The information processing apparatus obtains a container image, determine which of the plurality of storages is to store the container image, based on characteristic information of a program operating in a container included in the container image and characteristics of each of the plurality of storages, and starts the container based on the container image stored in a storage of the plurality of storages determined to store the container image.

10 Claims, 11 Drawing Sheets

(56) References Cited

U.S. PATENT DOCUMENTS

| | | | |
|---|---|---|---|
| 2019/0079788 A1* | 3/2019 | Ruty | G06F 3/0665 |
| 2020/0034167 A1* | 1/2020 | Parthasarathy | G06F 9/45558 |
| 2020/0192693 A1* | 6/2020 | Kawase | G06F 9/45558 |
| 2020/0320189 A1* | 10/2020 | Zhang | G06F 21/54 |

OTHER PUBLICATIONS

Muppidi et al. "Container Based Parallelization for Faster and Reliable Image Segmentation", 2017 IEEE, 6 pages.*

* cited by examiner

FIG. 6

```
{                                                          ⌐501  ⌐601
  "schemaVersion": 1,
  "name": "library/centos",
  "tag": "latest",
  "architecture": "amd64",
  "fsLayers": [
    { "blobSum":
"sha256:a3ed95caeb02ffe79cdd9fd84406680ae93d63fcb16422d10e8a7c22955b46d4" },
    { "blobSum":
"sha256:a3ed95caeb02ffe79cdd9fd84406680ae93d63fcb16422d10e8a7c22955b46d4" },
    { "blobSum":
"sha256:a3ed95caeb02ffe79cdd9fd84406680ae93d63fcb16422d10e8a7c2255b46d4" },
    { "blobSum":
"sha256:c3bf6062f354b9241db4481f24f488da418727673ea76c5162bfksu2eea29a4e" },
    { "blobSum":
"sha256:a3ed95caeb0321fe68cdd9fd84406680ae93sd3233cb16422d00e8a7c22955b46d4" }
  ],
  "history": [
    { "v1Compatibility": "{\"id\":\"0f73ae75014f435e...\",\"parent\":\"f37e6a610a37349d...\",
(ABBREVIATED...)" },
    { "v1Compatibility": "{\"id\":\"f37e6a610a37349d...\",\"parent\":\"f9a8cbc8dd13fb5b...\",
(ABBREVIATED...)" },
    { "v1Compatibility": "{\"id\":\"f9a8cbc8dd13fb5b...\",\"parent\":\"f6f39725d938c8ad...\",
(ABBREVIATED...)" },
    { "v1Compatibility": "{\"id\":\"f6f39725d938c8ad...\",\"parent\":\"47d44cb6f252ea4f...\",
(ABBREVIATED...)" },
    { "v1Compatibility": "{\"id\":\"47d44cb6f252ea4f...\", ..." }
  ],
  "signatures": [ "ABBREVIATED..." ],
  "imageSize " : 66,
  " demandSpeed " : 125,         ⌐602
  " writeFrequency " : 20,
  " readFrequency " : 200,
}
```

INFORMATION PROCESSING SYSTEM INCLUDING MULTIPLE STORAGES, INFORMATION PROCESSING APPARATUS, METHOD OF CONTROLLING THE SAME, AND STORAGE MEDIUM

BACKGROUND OF THE INVENTION

Field of the Invention

The present invention relates to an information processing system, an information processing apparatus, a method of controlling the same, and a storage medium.

Description of the Related Art

In recent years, a type of virtualization technology referred to as a container technology has been drawing attention. Using a container allows the runtime environment of applications and dependent libraries to become independent. In addition, unlike the conventional virtualization, container-based virtualization is characterized in that it does not use a guest OS via Hyperviser, and therefore it can be started faster than conventional virtual machines and has a smaller capacity. Accordingly, it becomes possible to gain advantages such as improvement of portability of application and scalability and easy execution of version upgrades.

In particular, with the advent of Open Source Software (OSS) referred to as Docker (registered trademark) for managing and executing containers, use of the container technology is spreading, and a wide variety of services are being constructed as Docker containers. The Docker container is generated using a software separation technology referred to as namespace, and a resource management technology referred to as cgroups included in the Linux (registered trademark) OS. Docker generates an instance of a container from an image file. Containers generated from an image file perform the same operation in any environment where Docker is operating and therefore are characterized in that container applications can be ported very easily by simply transferring the image file.

As a tool for container orchestration, Kubernetes (registered trademark) is widely used, which is a portable and extensible open-source platform for managing containerized workload and services. The aforementioned Kubernetes has a function of increasing or reducing the number of operating containers in accordance with the status of access to the service and a function of automatically switching host machines to operate the container in accordance with the amount of used resources of the host machine operating the container.

International Publication No. 2018/003020 describes a technology for using the container technology.

The image file on which a container is based includes libraries, file systems, or the like required by programs operating in the container, and therefore tends to grow larger in size than normal program files. Therefore, it is essential for the image file to be stored in a large-capacity storage. Unfortunately, depending on the storage characteristics, a non-functional requirement of a container program may not be met, or a lifetime of the storage may be reduced.

Japanese Patent No. 6547306 describes a method that, when pieces of data loaded on a memory are stored in a nonvolatile storage device, sorts the pieces of data into general information and confidential information and stores the sorted pieces of data. Unfortunately, the aforementioned technology may not allow an appropriately selection of a disk that is suitable for the non-functional requirement of the container program.

SUMMARY OF THE INVENTION

An aspect of the present invention is to eliminate the above-mentioned problem with conventional technology.

A feature of the present invention is to provide a technique to determine an optimal storage location of a container image and store the container image in consideration of characteristics of programs operating in the container and characteristics of the storage unit storing the container image.

According to a first aspect of the present invention, there is provided an information processing apparatus having a plurality of storages, comprising: one or more processors and one or more memories being configured to: obtain a container image; determine which of the plurality of storages is to store the container image, based on characteristic information of a program operating in a container included in the container image and characteristics of each of the plurality of storages; and start the container based on the container image stored in a storage of the plurality of storages determined to store the container image by the determination.

According to a second aspect of the present invention, there is provided an information processing system having an information processing apparatus and a plurality of servers connected to the information processing apparatus, the information processing apparatus comprising: one or more processors and one or more memories being configured to: obtain a container image; obtain characteristics of a storage device of each of the plurality of servers; determine which of the plurality of servers is to store the container image, based on the obtained characteristics of the storage device of each of the plurality of servers and characteristic information of a program operating in a container included in the container image; store the container image in a server of the plurality of servers determined to store the container image; and instruct the server storing the container image to start the container.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 depicts a view illustrating a specific example of a manifest file related to the first exemplary embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. In the following exemplary embodiments, an example of an information processing apparatus related to the present invention will be described using an image forming apparatus as an example.

First Exemplary Embodiment

Figure 1:
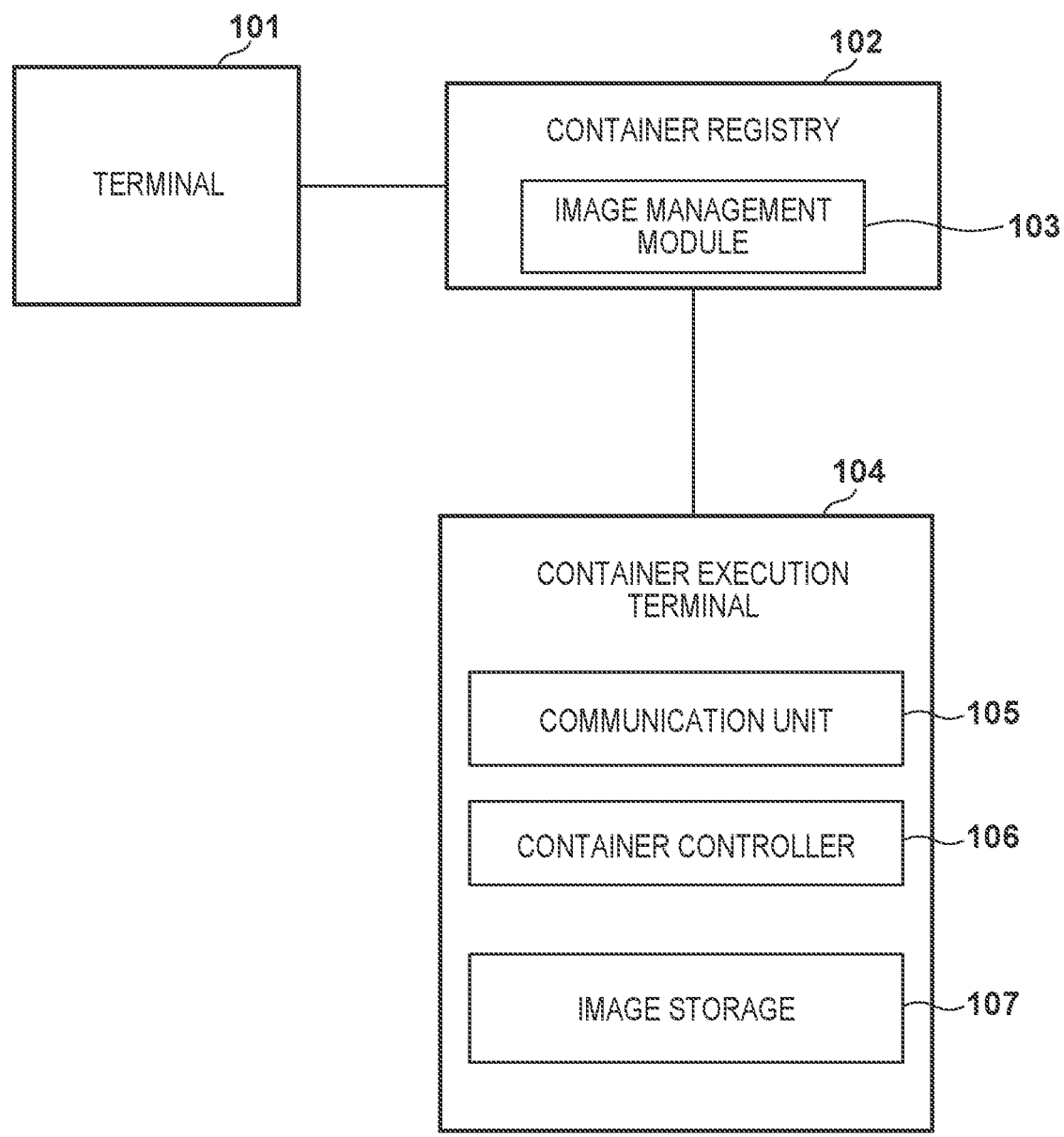
FIG. 1 is an explanatory diagram of a configuration of a system related to a first exemplary embodiment of the present invention.

FIG. 1 is an explanatory diagram of a configuration of an information processing system related to a first exemplary embodiment of the present invention. The information processing system is representative of a configuration of a basic system for when executing a container, and referring to FIG. 1, an overview of the configuration for when the container is executed will be described.

A terminal 101 is a terminal for developing a program as a container. A developer registers, in a container registry 102, a container image created with the terminal 101. Here, the container registry 102, which is a general-purpose server, has an image management module 103 for managing container images.

Regarding a container execution terminal 104, a container controller 106 communicates with the container registry 102 via a communication unit 105, obtains a container image stored by the image management module 103 of the container registry 102, and stores the container image in an image storage 107. The container controller 106 generates a container based on the container image stored in the image storage 107 and starts a program operation of the container. Here, an example of the container image is illustrated in FIG. 11.

Figure 11:
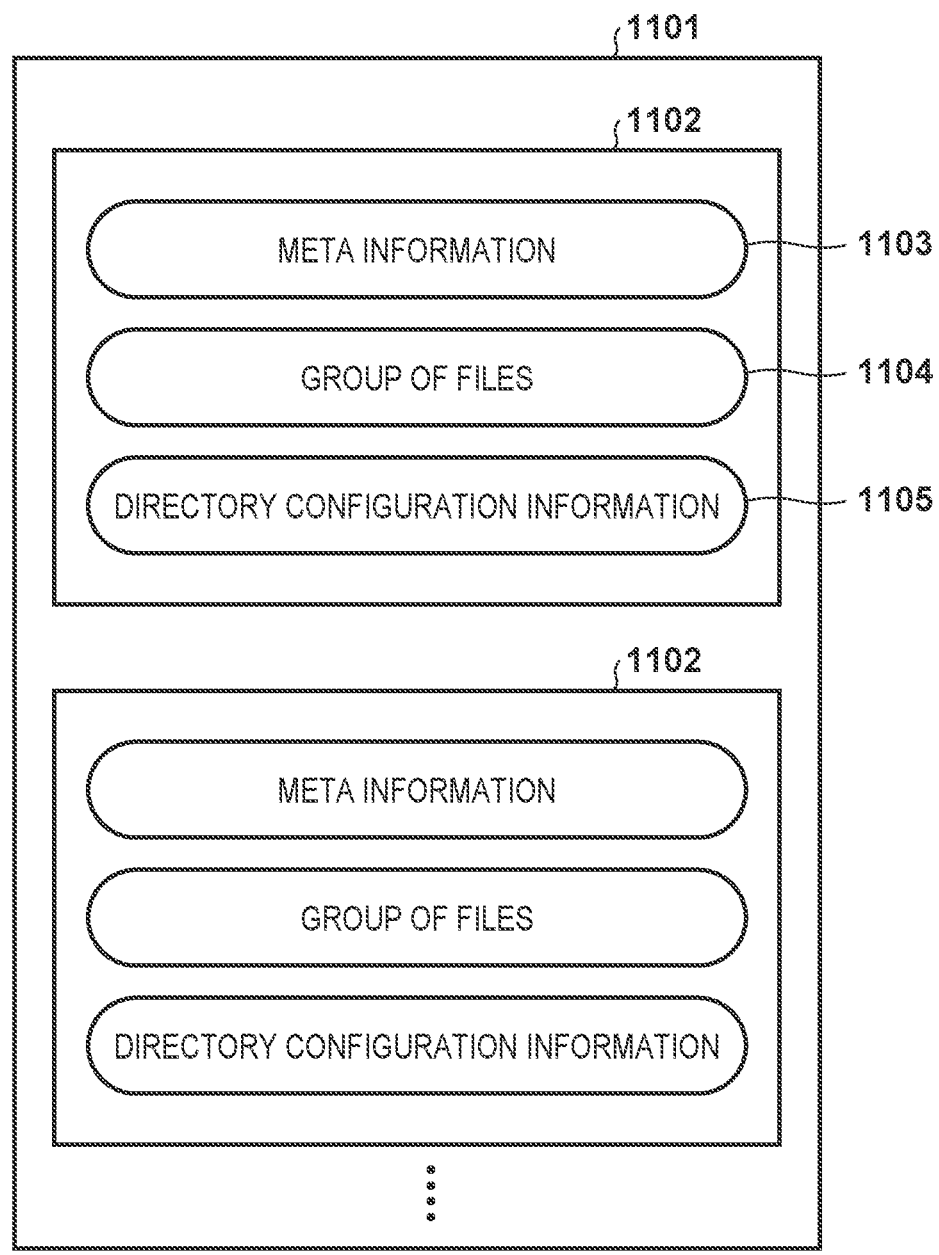
FIG. 11 depicts a view illustrating an example of a container image related to the exemplary embodiment.

FIG. 11 depicts a view illustrating an example of a container image related to the first exemplary embodiment.

A container image 1101 forms a single file of a plurality of stacked image layers 1102. The image layer 1102 includes meta information 1103 such as arguments or setting information when a program is executed, a group of files 1104 such as libraries or commands, directory configuration information 1105, and the like.

Figure 2:
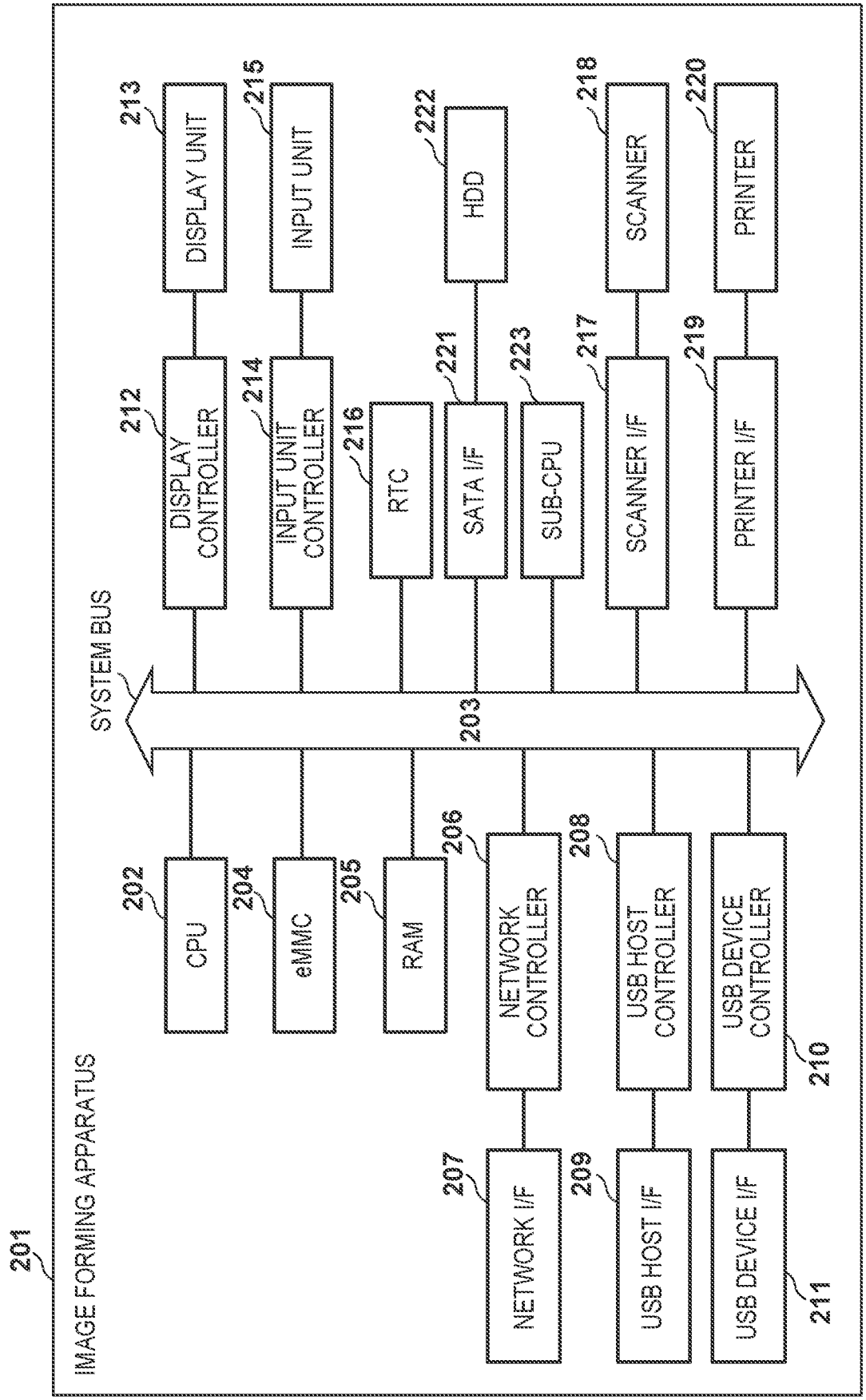
FIG. 2 is a block diagram explaining a hardware configuration of an image forming apparatus, which is an example of a container execution terminal related to the first exemplary embodiment.

FIG. 2 is a block diagram explaining a hardware configuration of an image forming apparatus 201, which is an example of a container execution terminal related to the first exemplary embodiment.

A central processing unit (hereinafter, CPU) 202, which is a main CPU, executes software to operate the image forming apparatus 201 and controls an operation of the image forming apparatus 201. An embedded MultiMediaCard (eMMC) 204 stores software of the image forming apparatus 201 and software to be executed by a sub-CPU 223. The eMMC 204 further stores a database, a temporary storage file, and the like, which are required to operate the image forming apparatus 201. A RAM 205 provides a software deploying area for the image forming apparatus 201, and a work area for the CPU 202 during operation. In addition, the RAM is used to store variables during program operation and data transferred from each unit via Direct Memory Access (DMA). Although generally eMMC has a disadvantage such as limited rewriting lifetime, slower read and write speed than SSD, and the like, it also has advantages such as low price, low power consumption, and the like.

A network controller 206 performs communication, via a network interface (I/F) 207, with other equipment connected to the network. A USB host controller 208 controls communication with USB devices via a USB host I/F 209. Although only one USB host I/F 209 is illustrated in FIG. 2, there are actually a plurality of USB host I/Fs 209. A USB device controller 210 communicates with USB hosts via a USB device I/F 211. When the image forming apparatus 201 functions as a USB device, a USB is used to transmit print data or scanned data from a USB host to another USB host.

A display controller 212 performs display control to display an operation status of the image forming apparatus 201, for example, on a display unit 213 so that the user can check the operation status. An input unit 215 accepts an instruction from the user, and the instruction is transmitted to the CPU 202 via an input unit controller 214. The input unit 215 includes, specifically, a keyboard, a pointing device, a numeric keypad, a cursor key, a touch panel, an operation unit keyboard, and the like. In a case where the input unit 215 includes a touch panel, the input unit 215 takes on a form in which it is physically attached to the surface of the display unit 213. A real time clock (hereinafter, RTC) 216 has a clock function, an alarm function, a timer function, and the like.

A scanner 218 is connected to a system bus 203 via a scanner I/F 217. In addition, a printer 220 is connected to the system bus 203 via a printer I/F 219. A hard disk drive (HDD) 222 is connected to the system bus 203 via SATA I/F 221. The HDD 222 stores temporary data or the like of a large-sized file or an application. In addition, the sub-CPU 223 is connected to the system bus 203. The sub-CPU 223 mainly controls the scanner 218, the printer 220, and the like. The system bus 203 functions as a path that allows the CPU 202 to access each of the aforementioned units and a path that allows other units to access each other.

Figure 3:
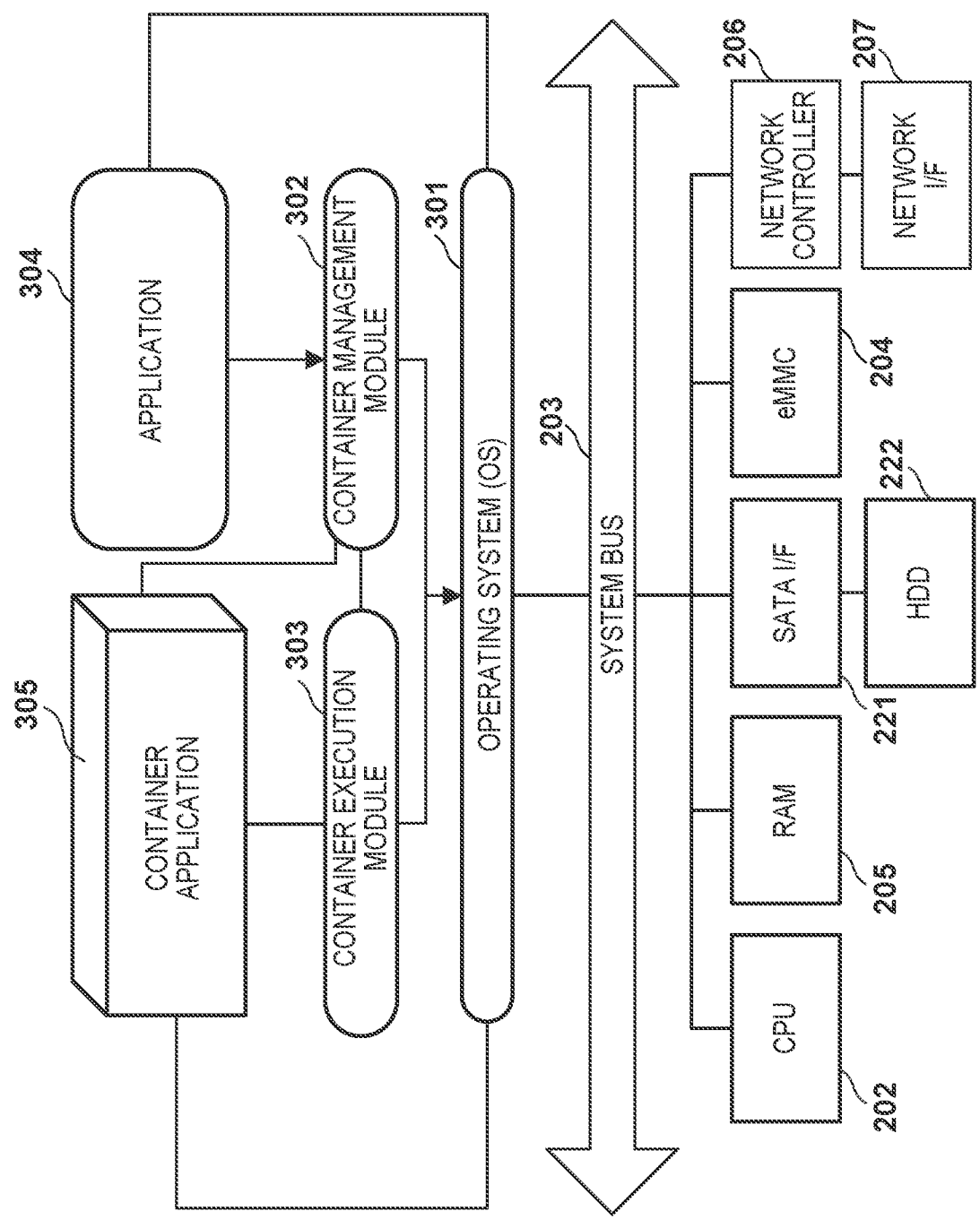
FIG. 3 is a block diagram explaining a software configuration for executing a container in the image forming apparatus related to the first exemplary embodiment.

FIG. 3 is a block diagram explaining a software configuration to execute a container in the image forming apparatus 201 related to the first exemplary embodiment. Referring to FIG. 3, a basic software operation related to the first exemplary embodiment will be described. In addition, a container execution module 303 will be described, taking as an example the case of using Docker as described above.

An operating system 301 intended to operate in the image forming apparatus 201 operates by executing, by the CPU 202, an instruction of a program deployed on the RAM 205. The operating system 301 allocates resources of the CPU 202, the RAM 205, and the HDD 222 in order to operate an application 304, a container management module 302, and the container execution module 303. The container execution module 303 utilizes a resource management function provided by the operating system 301 to manage resource allocation to operate a container application 305. Unless otherwise stated, these pieces of software are assumed to be executed by the CPU 202.

The container application 305, the application 304, and the container management module 302 can communicate with an external network via the network controller 206. The container application 305, being stored in the HDD 222 or the eMMC 204 in an image file format, starts the operation as a container by a start processing performed by the container execution module 303, and stops the operation when a stop processing is performed. The container management module 302, when receiving a start request of the container from the application 304, instructs the container execution module 303 to start the container. In addition, the container management module 302 instructs the container execution module 303 to stop the container when receiving a stop request of the container application 305 from the application 304 or when an error occurs in the container application 305.

Figure 4:
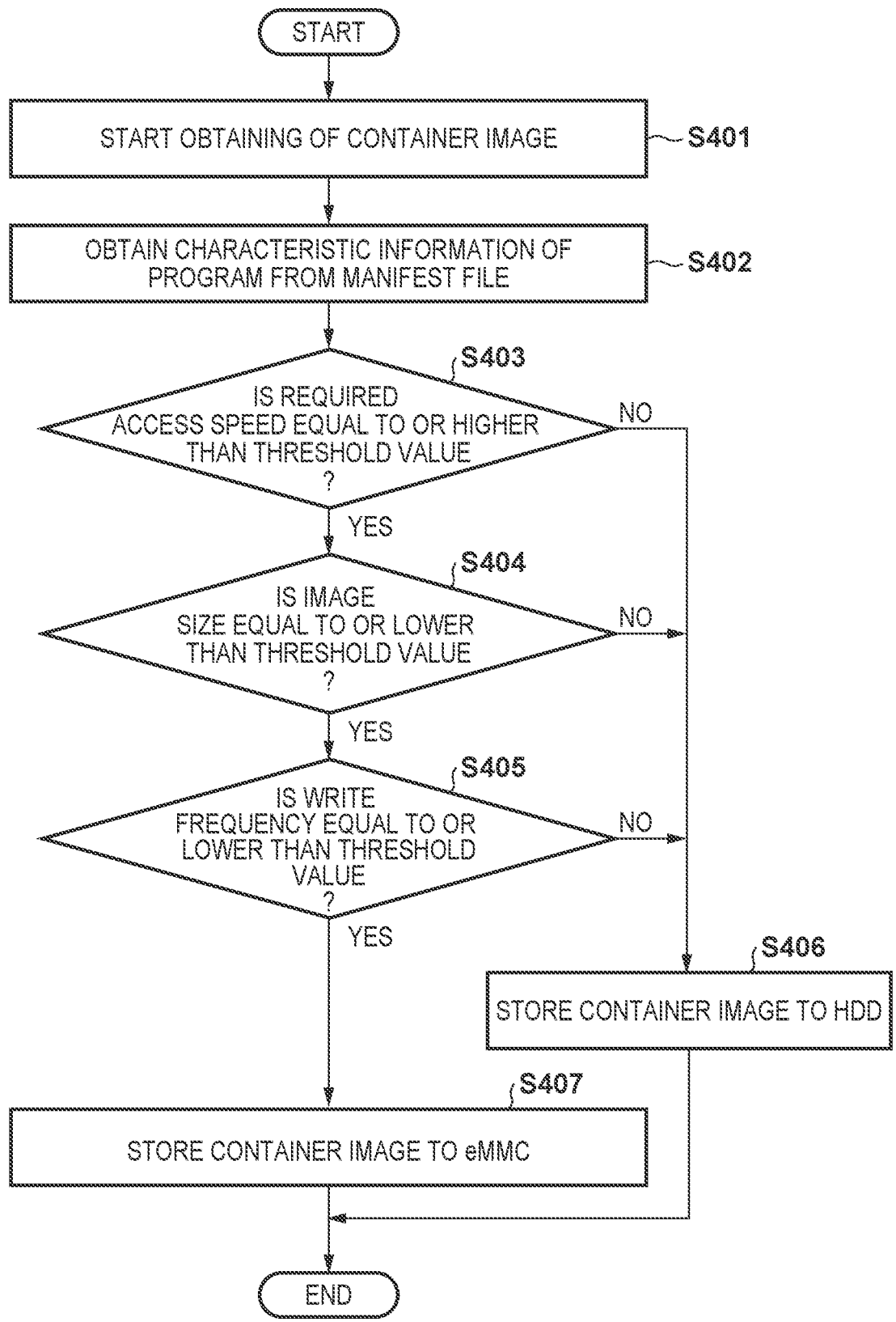
FIG. 4 is a flowchart for describing processing to determine a storage destination of a container image in the image forming apparatus related to the first exemplary embodiment.

FIG. 4 is a flowchart for describing processing of determining a storage destination of a container image in the image forming apparatus 201 related to the first exemplary embodiment.

Figure 5:
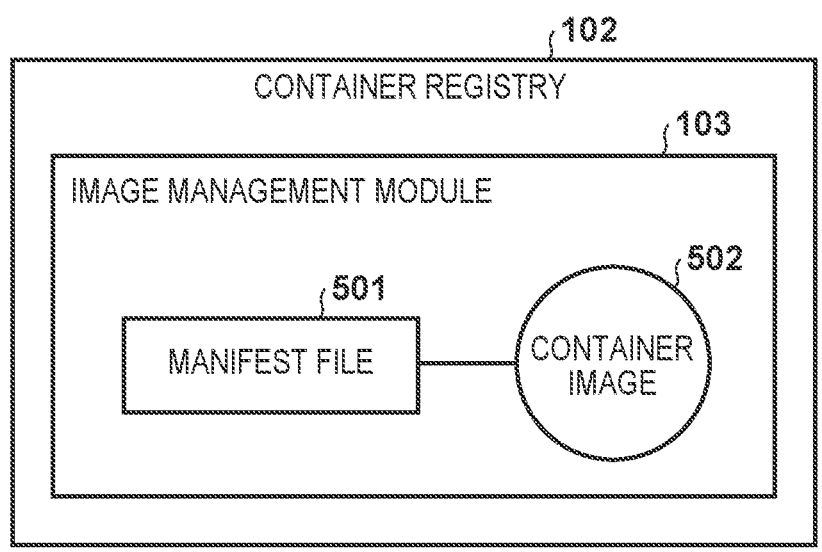
FIG. 5 is a block diagram explaining a configuration of a container registry related to the first exemplary embodiment.

FIG. 5 is a block diagram explaining a configuration of the container registry 102 related to the first exemplary embodiment, and FIG. 6 illustrates a specific example of a manifest file related to the first exemplary embodiment.

The processing in FIG. 4 will be described below. When the application 304 issues an obtaining request of a container image to the container management module 302, the container management module 302 communicates with the container registry 102 via the network controller 206 and starts obtaining a container image 502 (FIG. 5) in step S401. As illustrated in FIG. 5, the image management module 103 of the container registry 102 manages a manifest file 501 and the container image 502 as a pair. Although only a single pair is illustrated in FIG. 5, there may actually be a plurality of pairs of a manifest file and a container image. As illustrated in FIG. 6, characteristic information 602 of a program operating in a container and image configuration information 601 are described in the manifest file 501. These pieces of information are preliminarily provided when the container image 502 is created on the terminal 101 used by the developer.

When obtaining of the container image 502 starts, the characteristic information 602 described in the manifest file 501 is first obtained in step S402. The characteristic information 602 includes at least one piece of information such as, for example, an image size of the container and a disk access speed, a disk writing frequency, and a disk reading frequency that are required by a program operating in the container. In the example of FIG. 6, an image size of "66", an access speed of "125", a writing frequency of "20", and a reading frequency of "200" have been set for the container.

Next, the processing proceeds to step S403 in which the CPU 202 determines, from the obtained characteristic information 602, whether the required disk access speed is equal to or higher than a threshold value. When it is determined here that the threshold value is not exceeded, the processing proceeds to step S406 at which the CPU 202 stores the container image 502 in the HDD 222 and ends the processing. When, on the other hand, the CPU 202 determines in step S403 that the required disk access speed exceeds the threshold value, the processing proceeds to step S404 in which the CPU 202 determines whether the image size is equal to or lower than a threshold value. Here, when the CPU 202 determines that the image size is not equal to or less than the threshold value, the processing proceeds to step S406 in which the CPU 202 stores the container image 502 in the HDD 222 and ends the processing.

In addition, when the CPU 202 determines at step S404 that the image size is equal to or lower than the threshold value, the processing proceeds to step S405 in which the CPU 202 determines whether the disk writing frequency is equal to or lower than a threshold value. Here, when the CPU 202 determines that the disk writing frequency is equal to or lower than the threshold value, the processing proceeds to step S407 in which the CPU 202 stores the container image 502 in the eMMC 204 and ends the processing. When, on the other hand, the CPU 202 determines in step S405 that the disk writing frequency is not equal to or less than the threshold, the processing proceeds to step S406 in which the CPU 202 stores the container image 502 in the HDD 222 and ends the processing.

Note that, although the container image 502 is obtained from the container registry 102 located on the server in the first exemplary embodiment, the present invention is not limited thereto. For example, a storage medium such as USB flash drive may be preliminarily built as a container registry, and the container image 502 may be obtained from the USB flash drive via the USB host I/F 209.

According to the first exemplary embodiment, as described above, when a container image is obtained, it is determined whether the program characteristic information described in the manifest file is suitable for the storage device. The foregoing allows to determine an optimal storage device to store a container image, in a case where there is a plurality of storage devices in which the container image can be stored. The foregoing allows to appropriately enjoy the performance of a storage device required by a program operating in the container.

Specifically, for example, storing in the HDD allows the use of a large-sized container image and suppresses the reduction of disk lifetime due to write processing by a program operating in the container. On the other hand, for example, storing in the eMMC allows the utilization of the high access speed to quickly start the container and allows the program to operate at a high speed.

Second Exemplary Embodiment

Although a plurality of disks storing the container image 502 are present inside the image forming apparatus 201 in the first exemplary embodiment described above, the disks may be distributed across a plurality of apparatuses.

Figure 7:
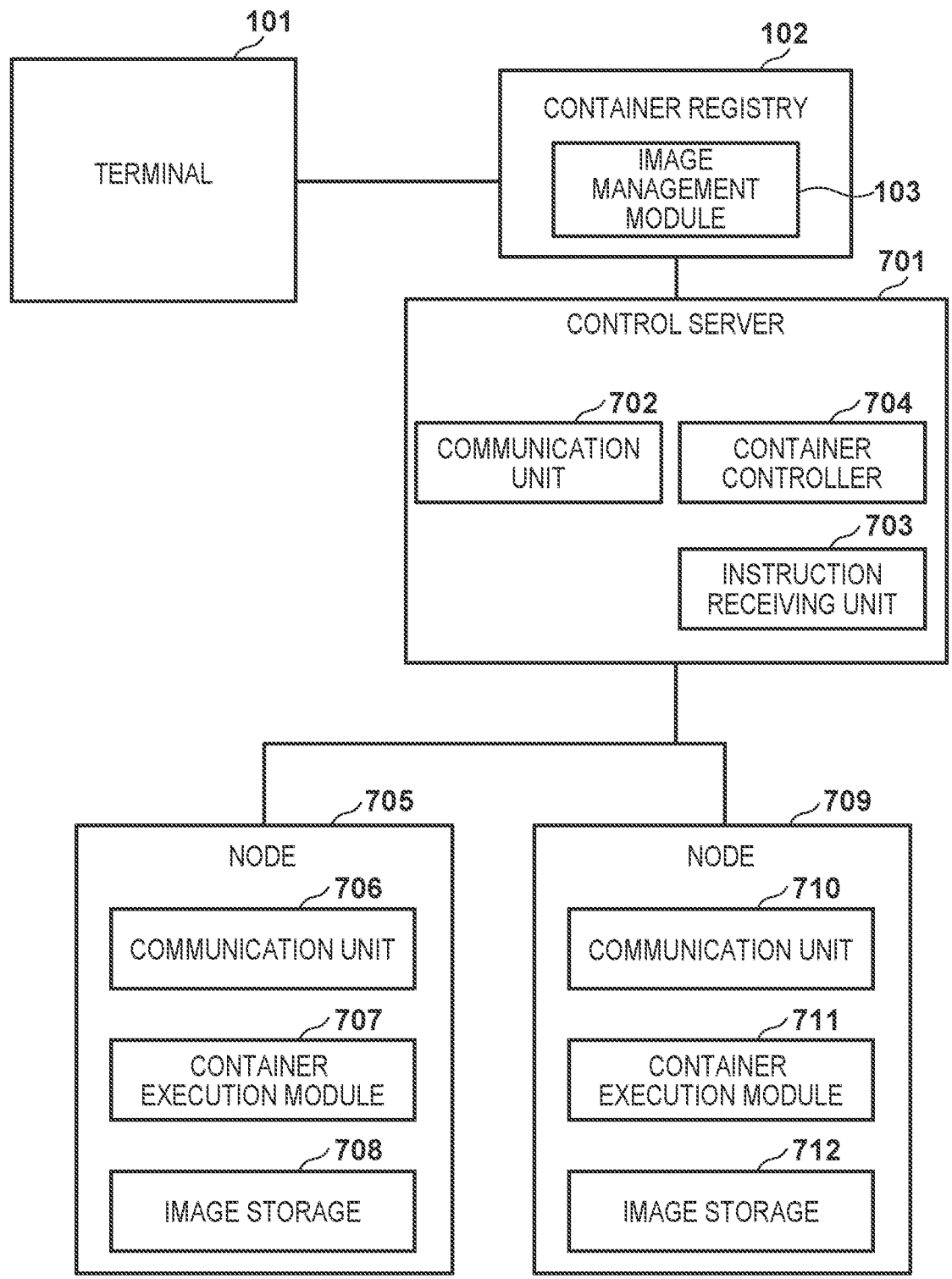
FIG. 7 is an explanatory diagram of a configuration of a system related to a second exemplary embodiment of the present invention.

FIG. 7 is an explanatory diagram of a configuration of an information processing system related to a second exemplary embodiment of the present invention. The information processing system indicates a basic configuration of a server cloud providing cloud service. Here, in FIG. 7, the parts common to those in the first exemplary embodiment described above are provided with the same reference numbers, and descriptions thereof will be omitted. In addition, the hardware configuration or the like of the image forming apparatus, which is an example of a control server 701 related to the second exemplary embodiment, is similar to that of the aforementioned first exemplary embodiment, and therefore description thereof will be omitted.

Figure 8:
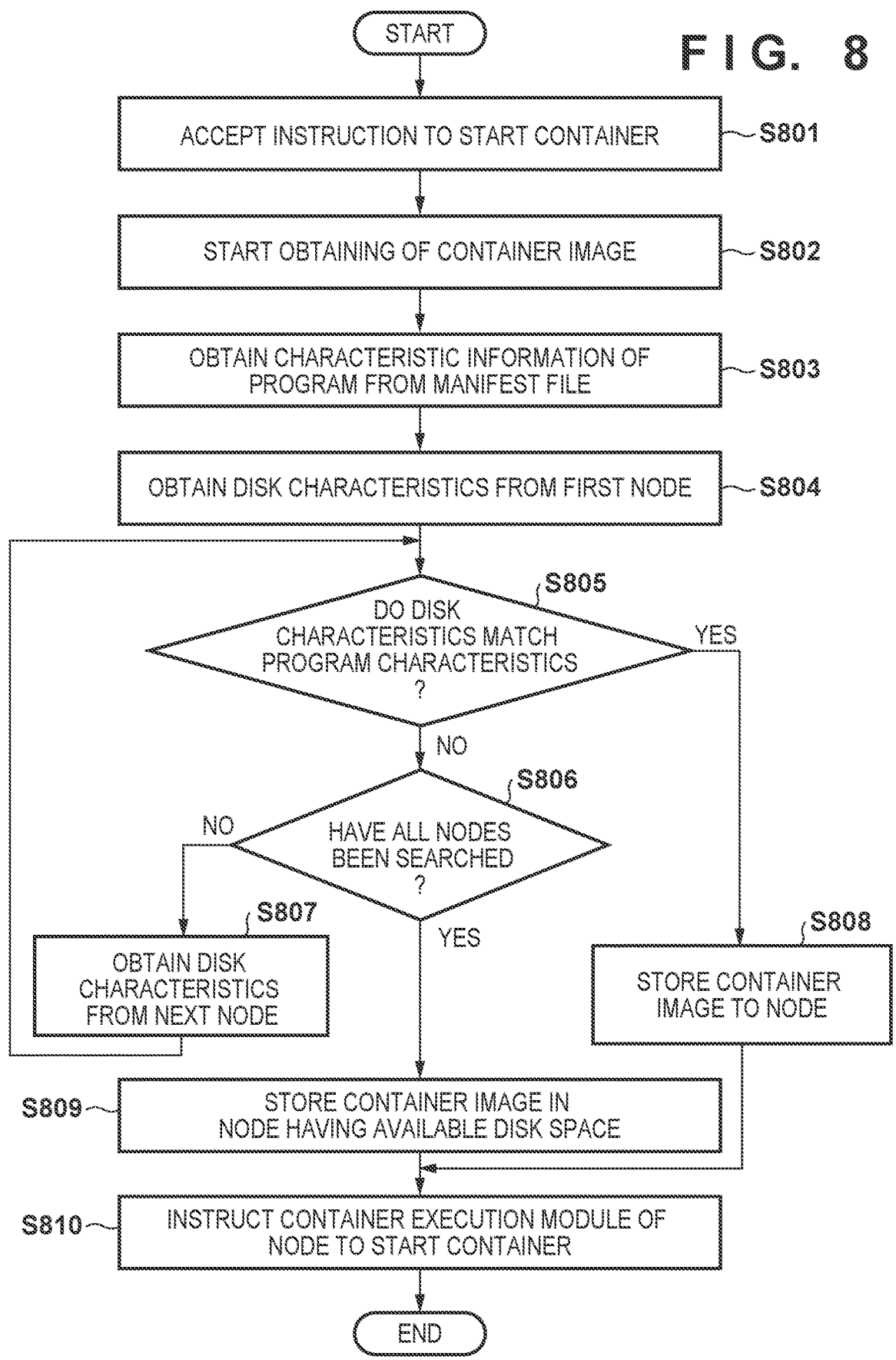
FIG. 8 is a flowchart for describing processing to be performed when a control server related to the second exemplary embodiment stores a container image in nodes corresponding to a plurality of apparatuses and starts the container via the nodes.

FIG. 8 is a flowchart for describing processing to be performed for when the control server 701 related to the second exemplary embodiment stores a container image in nodes corresponding to a plurality of apparatuses and starts the container via the nodes.

The control server 701 has a communication unit 702 to communicate with an external apparatus, an instruction receiving unit 703 that receives, from the outside, instructions such as starting the container and accessing the container, and a container control unit 704 having functions such as operation control or load balancing of the container group. The control server 701 has a node 705 and a node 709 connected thereto and manages the same. Although two nodes are illustrated here, there may be more than two nodes. The nodes 705 and 709 have communication units 706 and 710, container execution units 707 and 711, and image storages 708 and 712, respectively.

Next, description will be provided, referring to the flowchart of FIG. 8.

When the instruction receiving unit 703 of the control server 701 receives, in step S801, an instruction to start a container, the processing proceeds to step S802 in which the container control unit 704 communicates with the container registry 102 via the communication unit 702 to start obtaining the container image 502. When obtaining processing of the container image 502 starts, the container control unit 704 first obtains, in step S803, the characteristic information 602 from the manifest file 501 stored in the image management module 103. Next, the processing proceeds to step S804 in which the container control unit 704 communicates with the first node and obtains disk characteristics of the image storage of the first node. The processing then proceeds to step S805 in which the container control unit 704 determines whether the disk characteristics of the image storage match the program characteristics of the container image.

Here, when it is determined that the disk characteristics match the program characteristics of the container image, the processing proceeds to step S808 in which the container control unit 704 stores the container image 502 in the node, and the processing proceeds to step S810.

When, on the other hand, it is determined, in step S805, that the disk characteristics do not match the program characteristics, the processing proceeds to step S806. In step S806, the container control unit 704 determines whether all the nodes have been searched, and the processing proceeds to step S807 when not all the nodes have been searched. Then, the container control unit 704 obtains disk characteristics of the image storage of the next node, and the processing proceeds to step S805. The container control unit 704 then determines whether the disk characteristics match the program characteristics again.

When no node whose disk characteristics match the program characteristics is present, despite having searched all the nodes in step S805, the processing proceeds to step S809 in which the container control unit 704 stores the container image 502 in a node having an available disk space in the image storage. When the container control unit 704 stores the container image 502 in any of the nodes in step S809, the processing proceeds to step S810 in which the container control unit 704 instructs the container execution module of the node to start the container and ends the processing.

According to the second exemplary embodiment, as described above, disk characteristics of each node are obtained and determined whether to match the program characteristics of the container image to be started. As such, it is possible to appropriately determine a storage location and an execution location of a container image, even for a server configuration of a cloud service executing a container using a plurality of nodes.

Third Exemplary Embodiment

Figure 9:
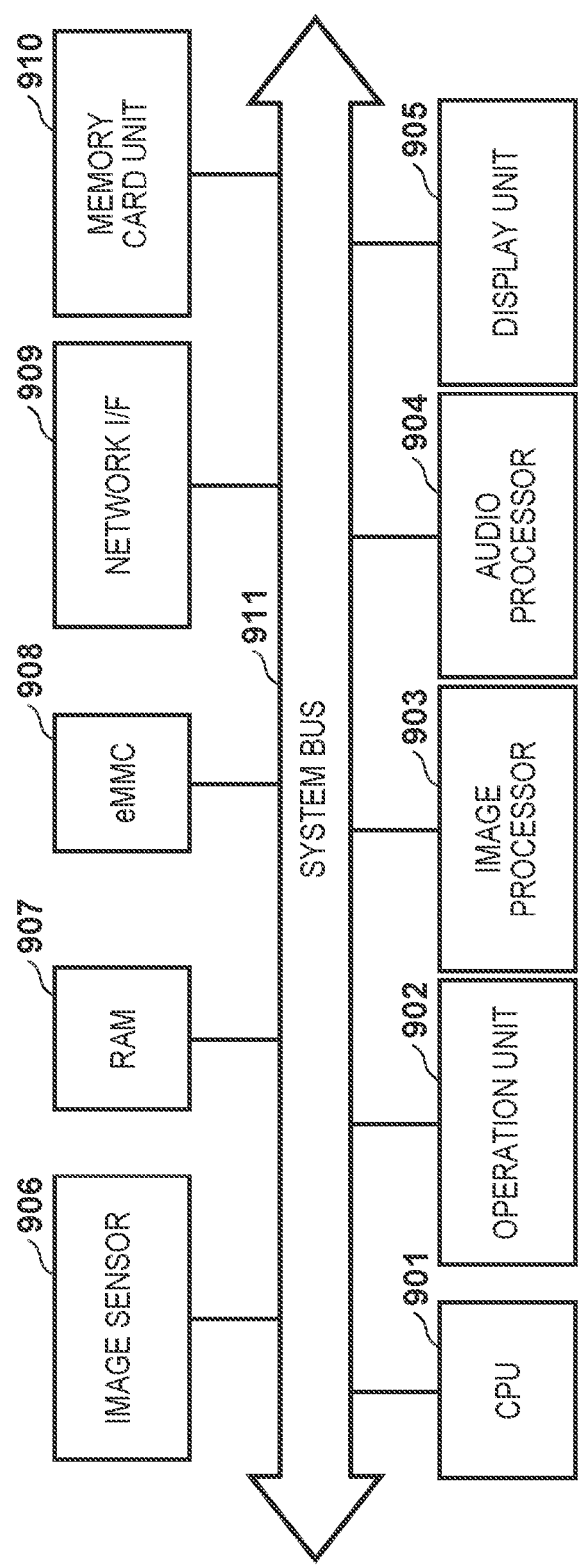
FIG. 9 is a block diagram explaining a hardware configuration of a digital camera related to a third exemplary embodiment of the present invention.

FIG. 9 is a block diagram explaining a hardware configuration of a digital camera related to a third exemplary embodiment of the present invention.

A CPU 901 deploys a program stored in the eMMC 908 on a RAM 907, executes the deployed program, and controls the digital camera. The RAM 907 provides a work area of the CPU 901 to store various data. The CPU 901 controls, via a system bus 911, respective units connected to the system bus 911. Execution of a container is also performed by the CPU 901, and details of the container execution method are similar to the aforementioned first exemplary embodiment.

A network I/F 909 is used to communicate with external equipment. An operation unit 902 is a unit that allows the user to operate the camera. When the operation unit 902 receives an operation from the user, an image sensor 906 captures an image of the subject. An image processor 903 processes image data or video data obtained through image capturing by the image sensor 906. An audio processor 904 records sound during video capturing. A display 905 provides the user with a user interface (UI). A memory card unit 910 is a flash memory such as an SD card, for example, which is used for storing image data and can be freely attached and detached by the user.

Figure 10:
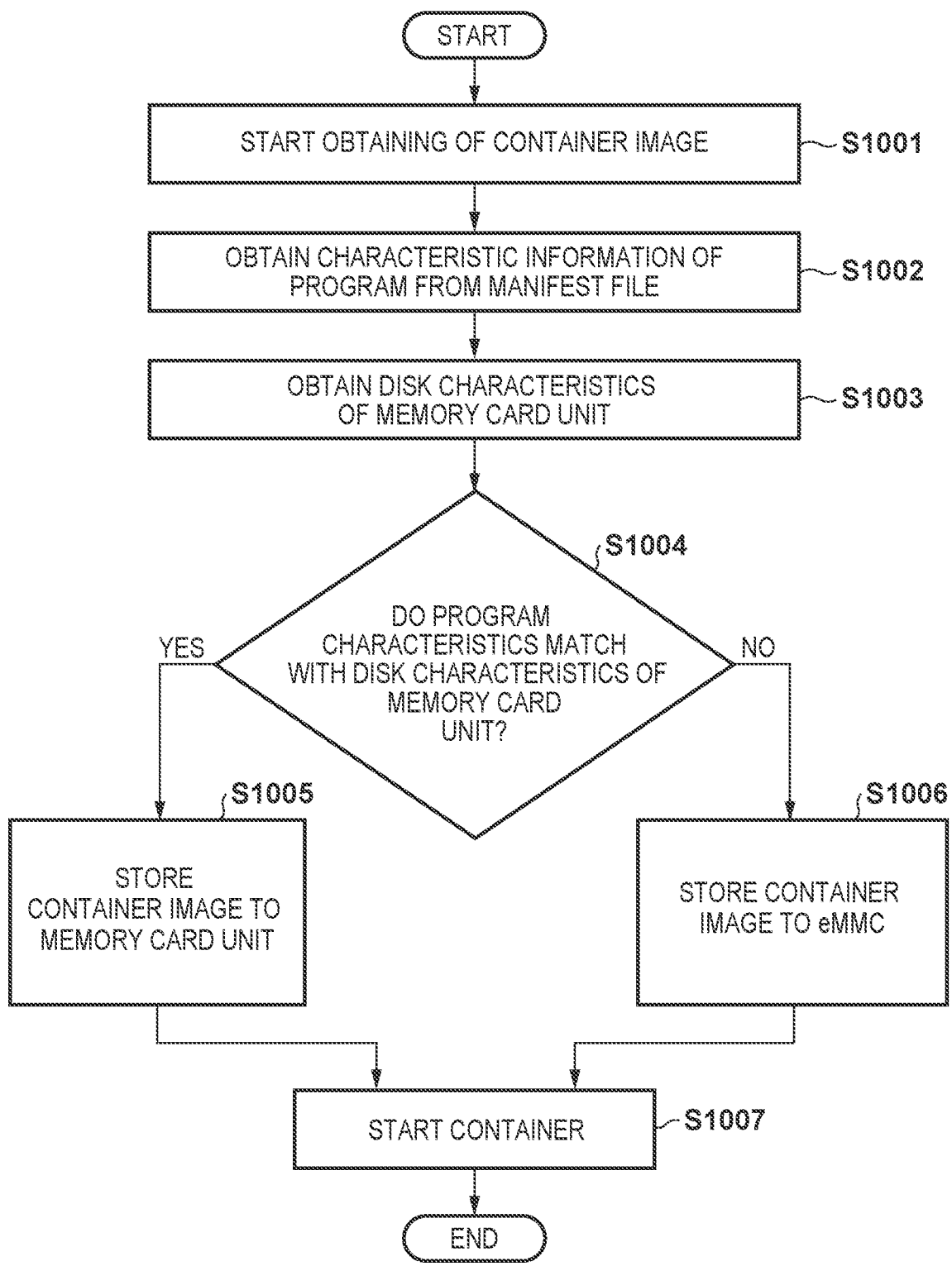
FIG. 10 is a flowchart for describing processing to store a container image in the digital camera related to the third exemplary embodiment.

FIG. 10 is a flowchart for describing store processing of a container image in the digital camera related to the third exemplary embodiment. Here, the processing indicated by the flowchart is achieved by executing, by the CPU 901, a program deployed on the RAM 907.

First, in step S1001, the CPU 901 starts obtaining of the container image 502 from the container registry 102 via the network I/F 909, when executing a container. The processing then proceeds to step S1002 in which the CPU 901 obtains the characteristic information 602 from the manifest file 501. Next, the processing proceeds to step S1003 in which the CPU 901 obtains the disk characteristics of the memory card unit 910. Here, the disk characteristics of the memory card unit 910 include at least one of an available capacity or an access speed. In step S1004, the CPU 901 determines whether the characteristic information 602 matches the disk characteristics of the memory card unit 910, and when both match, the processing proceeds to step S1005 in which the CPU 901 stores the container image 502 in the memory card unit 910, and the processing proceeds to step S1007.

When, on the other hand, there is no match, the processing proceeds to step S1006 in which the CPU 901 stores the container image 502 in the eMMC 908, and the processing proceeds to step S1007. In step S1007, the CPU 901 starts the container based on the stored container image and ends the processing. Note that, although the third exemplary embodiment has been described taking the SD card as an example for the memory card unit, a storage medium such as a USB flash drive, for example, may also be used.

According to the third exemplary embodiment, as described above, it is possible to determine an optimal storage location of a container image for a compact IoT

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-85581, filed May 20, 2021, which is hereby incorporated by reference herein in its entirety.

What is claimed is:

1. An information processing apparatus having a plurality of storages, comprising:
    one or more processors and one or more memories being configured to:
    obtain a container image;
    determine which of the plurality of storages is to store the entire container image, based on characteristic information of a program operating in a container included in the container image and characteristics of each of the plurality of storages;
    receive, by a container management module, a start request from an application; and
    start, by the container execution module, based on the received start request, the container based on the container image stored in a storage of the plurality of storages determined to store the entire container image by the determination,
    wherein the one or more processors and the one or more memories being configured to determine, in the determination, that the entire container image is to be stored in a storage whose characteristics match the characteristic information of the program, and
    wherein the characteristic information of the program includes at least one of an image size, an access speed, a writing frequency, and a reading frequency.

2. The information processing apparatus according to claim 1, wherein the characteristic information of the program is described in a manifest file included in the container image.

3. The information processing apparatus according to claim 1, wherein the characteristics include at least one of an available capacity of the storage or an access speed of the storage.

4. An information processing system having an information processing apparatus and a plurality of servers connected to the information processing apparatus, the information processing apparatus comprising:
    one or more processors and one or more memories being configured to:
    obtain a container image;
    obtain characteristics of a storage device of each of the plurality of servers;
    determine which of the plurality of servers is to store the entire container image, based on the obtained characteristics of the storage device of each of the plurality of servers and characteristic information of a program operating in a container included in the container image,
    wherein the one or more processors and the one or more memories being configured to determine, in the determination, that the entire container image is to be stored in a storage whose characteristics match the characteristic information of the program, and
    wherein the characteristic information of the program includes at least one of an image size, an access speed, a writing frequency, and a reading frequency;
    store entire the container image in a server of the plurality of servers determined to store the container image;
    receive, by a container management module, a start request from an application; and
    instruct, by the container execution module, based on the received start request, the server storing the container image to start the container.

5. The information processing system according to claim 4, wherein the characteristic information of the program is described in a manifest file included in the container image.

6. The information processing system according to claim 4, wherein the characteristic information of the program includes at least one of an image size, an access speed, a writing frequency, or a reading frequency.

7. The information processing system according to claim 4, wherein the one or more processors and the one or more memories being configured to:
    determine, in the determination, that the container image is to be stored in a server having a storage device whose characteristics match the characteristic information of the program.

8. The information processing system according to claim 4, wherein the characteristics includes at least one of an available capacity of the storage device or an access speed of the storage device.

9. A method of controlling an information processing apparatus having a plurality of storages and being configured to perform processing using a container technology, the method comprising:
    obtaining a container image;
    determining which of the plurality of storages is to store the entire container image, based on characteristic information of a program operating in a container included in the container image and characteristics of each of the plurality of storages; and receiving, by a container management module, a start request from an application; and starting, by the container execution module, based on the received start request, the container based on the container image stored in a storage of the plurality of storages determined to store the entire container image in the determining, wherein the determining includes determining that the entire container image is stored in a storage whose characteristics match the characteristic information of the program, and wherein the characteristic information of the program includes at least one of an image size, an access speed, a writing frequency, and a reading frequency.

10. A non-transitory computer-readable storage medium storing a program for causing a processor to execute a method of controlling an information processing apparatus having a plurality of storages and being configured to perform processing using a container technology, the method comprising:

obtaining a container image;

determining which of the plurality of storages is to store the entire container image, based on characteristic information of a program operating in a container included in the container image and characteristics of each of the plurality of storages;

receiving, by a container management module, a start request from an application; and starting, by the container execution module, based on the received start request, the container based on the container image stored in a storage of the plurality of storages determined to store the entire container image in the determining, wherein the determining includes determining that the entire container image is stored in a storage whose characteristics match the characteristic information of the program, and wherein the characteristic information of the program includes at least one of an image size, an access speed, a writing frequency, and a reading frequency.

* * * * *